2,831,885
HYDROXYETHYL POLYCARBOXYMETHYL POLYAMINES

Harry Kroll and Martin Knell, Warwick, R. I., assignors to Geigy Chemical Corporation, New York, N. Y., a corporation of Delaware No Drawing. Application August 13, 1954
Serial No. 449,772

9 Claims. (Cl. 260—439)

This invention is that of N-hydroxyethyl N,N',N'',N''-tetracarboxymethyl diethylenetriamine and N,N-dihydroxyethyl N',N'',N''-tricarboxymethyl diethylenetriamine, their water-soluble salts with monovalent cations (e. g. monovalent metals such as the alkali metals, as well as radicals that act as monovalent cations, as the ammonium radical), and also their water-soluble chelates with divalent and higher than divalent metals. The invention includes the preparation of these salts, chelates, and also their aqueous solutions.

Very few sequestering agents investigated keep ferric iron in solution within the pH range of nine to twelve. For example, at pH 5 one mole of ethylenediamine tetraacetic acid (briefly designated EDTA) will sequester (and thereby hold in solution) approximately seven-tenths of a mole of ferric iron. However, on raising the basicity of the solution, the amount of iron held in solution decreases and is zero at pH 12. Similarly, while a mole of N,N'-dihydroxyethyl N,N'-dicarboxymethyl ethylenediamine holds one mole of ferric iron in solution at pH 5, at pH 9 it holds only half that in solution, and at one percent sodium hydroxide concentration the amount held in solution drops to seven one-hundredths of a mole.

In a study made in the project that produced this invention, diethylenetriamine pentaacetic acid (briefly called DETPA) showed favorable action in solubilizing ferric hydroxide. One mole of the sodium salt of DETPA held in solution approximately one mole of ferric iron. However, raising the alkalinity to pH 9 decreased the sequestering capacity to seven-tenths of a mole of ferric iron per mole of DETPA.

The N-hydroxyethyl N,N',N'',N''-tetracarboxymethyl diethylenetriamine and N,N-dihydroxyethyl N',N'',N''-tricarboxymethyl diethylenetriamine and their water-soluble salts with monovalent cations, of the invention, not only have just as effective sequestering capacity for ferric iron at about pH 5 as do the other products above described, but in contrast to them will retain such iron in solution in the same or even higher concentrations in the more alkaline ranges such as pH 9 to 14.

The products of the invention, including the free acids shown by the general formula

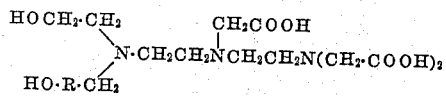
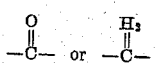

wherein R is selected from

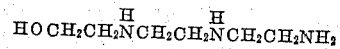

the water-soluble salts of these acids with monovalent cations, the water-soluble chelates of the free acids and of these water-soluble salts, and water-soluble acid addition salts of the free acids, are illustrated by, but not restricted to, the following examples:

Example 1.—*N-hydroxyethyl N,N',N'',N''-tetracarboxymethyl diethylenetriamine.*—In a round-bottomed, three-necked flask equipped with reflux condenser and bubbling tube, forty-four grams (1 mole) of ethylene oxide were bubbled into and absorbed by one hundred and three grams (1 mole) of diethylenetriamine at a temperature ranging between 30° to 150° C. (due to the exothermic nature of the reaction). The reaction product consisted essentially of the monohydroxyethyl derivative of diethylenetriamine, namely, $$HOCH_2CH_2\overset{H}{N}CH_2CH_2\overset{H}{N}CH_2CH_2NH_2$$

One hundred and forty-seven grams (1 mole) of this reaction product were dissolved in three hundred and sixty-eight grams of fifty percent sodium hydroxide and the solution was heated to reflux (about 126° C.). Then three hundred and forty-two grams of seventy percent glycolonitrile were added to the refluxing solution, dropwise over a period of three hours as fast as the released ammonia was liberated. Water was then added to five hundred grams of the reaction mixture to maintain a uniform solution by keeping all solids in solution and to enable the solution to flow readily. The resulting solution was treated with fifteen hundred grams of concentrated hydrochloric acid, mixed and allowed to cool. The precipitated sodium chloride was filtered off. The filtrate was concentrated to one fifth of its initial volume, filtered to remove a small amount of insoluble inorganic material, and cooled in an ice-bath over night. The mother liquor was filtered off of the white solid product which settled out. This product, washed free of mother liquor with fifty percent ethanol, was the tri-hydrochloride of N-hydroxyethyl N,N',N'',N''-tetracarboxymethyl diethylenetriamine.

The free acid, having the structure corresponding to R being carbonyl in the general formula given in column 1, lines 57–60, of this specification, may be derived from this tri-hydrochloride by: preparing a solution of about twenty-five to thirty percent of the hydrochloride in water, neutralizing the solution with solid sodium acetate, then adding methanol until its concentration is between about eighty to ninety percent, and cooling to separate out this free N-hydroxyethyl N,N',N'',N''-tetracarboxymethyl diethylenetriamine.

Example 2.—*N,N-dihydroxyethyl N',N'',N''-tricarboxymethyl diethylenetriamine.*—In a round-bottomed, three-necked flask as used in Example 1, seventy-one grams of N,N-dihydroxyethyl diethylenetriamine (prepared, for example, as described below) were dissolved in one hundred grams of fifty percent sodium hydroxide solution, and the resulting solution heated to reflux (105° C.). Then eighty-nine grams of glycolonitrile were added to the refluxing solution, dropwise over a period of three hours as fast as the released ammonia was liberated. When the addition of glycolonitrile was ended and the refluxing discontinued after the last of the released ammonia was driven off, the reaction solution was found by titration for the sequestering agent to contain twenty-two percent of the trisodium salt of the final product whose free acid has the structure corresponding to R being the methylene group, —$CH_2$—, in the general formula in column 1, lines 57–60, of this specification. The balance contained in the reaction solution was a small percentage of dissolved sodium hydroxide, the remainder of that portion of the one hundred grams of fifty percent sodium hydroxide that did not react to form sodium carboxylate groups.

(a) *Preparation of N,N-dihydroxyethyl diethylenetriamine.*—Two hundred and eighty-two parts of aminoethyl sulfuric acid ester and eight hundred and eighty parts of forty percent sodium hydroxide were introduced into a three liter flask and heated carefully to boiling over an open flame. The ethyleneimine formed was distilled off through an ice water cooled reflux condenser into a refluxing solution of five hundred and twenty-five parts of diethanolamine in fifteen hundred milliliters of water until the vapor temperature reached 106° C. The refluxing of the diethanolamine and water and ethyleneimine reaction solution was then continued for three hours. The water then was removed by being distilled off under vacuum. Fractional distillation of the residue then gave an eighty-five percent recovery of the diethanolamine, and a twenty-seven percent yield of N,N-dihydroxyethyl ethylenediamine (compound I), and as the still residue a five percent yield of N,N-dihydroxyethyl diethylenetriamine (compound II). The yields are based on the aminoethyl sulfuric acid ester. In this procedure compound I was the major product sought, although it made compound II available as a by-product.

The corresponding tri-alkali metal salt, other than the above trisodium salt, of N-hydroxyethyl N,N',N'',N''-tetracarboxymethyl diethylenetriamine and of N,N-dihydroxyethyl N',N'',N'' - tricarboxymethyl diethylenetriamine, for example, the tripotassium salt, is prepared by replacing the three hundred and sixty grams (Example 1) or one hundred grams (Example 2) of fifty percent sodium hydroxide used in the foregoing procedures by the stoichiometric equivalent of potassium hydroxide in the corresponding weight of its aqueous solution of similar concentration, and then completing the carboxymethylation with the glycolonitrile in the same way. Any other suitable concentration may be used.

The concentration of the N-hydroxyethyl N,N',N'',N''-tetracarboxymethyl diethylenetriamine or of the N,N-dihydroxyethyl N',N'',N'' - tricarboxymethyl diethylenetriamine (either one of them being referred to as the chelating agent) in any of the foregoing aqueous solutions of any of its tri-alkali metal salts is determined by the amount of heavy metal ion, such as copper, which can be bound by the chelating agent. This value is obtained by adding an excess of insoluble copper phosphate to a known volume of solution containing the selected tri-alkali metal salt of the N-hydroxyethyl N,N',N'',N''-tetracarboxymethyl diethylenetriamine or the N,N-dihydroxyethyl N',N'',N''-tricarboxymethyl diethylenetriamine and agitating the mixture until an equilibrium is attained. The resulting slurry is centrifuged, and the aqueous supernatant layer is analyzed for copper chelated by the tri-alkali metal salt of the polyaminocarboxylic acid. Since one mole of copper combines with one mole of the chelating agent, the chelated copper establishes the concentration of the polyaminocarboxylic acid in solution.

At the same time, the reaction just described with copper phosphate gave the corresponding copper chelate in aqueous solution in the supernatant liquid.

The corresponding iron (ferric as well as ferrous) chelates were made respectively from an aqueous solution of any of the above described tri-alkali metal salts, such as the trisodium salt, of each of these chelating agents by the same method described below after first determining the amount of iron the chelating agent could hold in solution at pH 9. The method developed for finding the ratio of ferric iron to chelating agent was as follows:

An aqueous solution of three milliliters of one-tenth molal ferric chloride and of one-tenth molal solution of the chelating agent was adjusted with aqueous sodium hydroxide solution to pH9 and then diluted to one hundred milliliters. The resulting mixture was agitated for twenty-four hours. The supernatant liquid then was separated by filtration and analyzed for iron colorimetrically. On using the substances in a molal ratio of one to one for the iron to the trisodium salt of the chelating agent, one hundred grams of the chelating agent were found to bind (or sequester) fifteen grams of iron.

*The ferrous chelate.*—To an aqueous solution containing one hundred grams of either of the foregoing chelating agents or a tri-alkali metal salt of either of them, there was admixed the quantity of an aqueous ferrous sulfate solution containing fifteen grams of iron, and thus yielded the ferrous chelate in solution, but containing the corresponding amount of sodium sulfate.

The solution of the sodium ferrous chelate of the polyaminocarboxylate can be spray dried thereby yielding that chelate in dry form as a brown powder.

*The ferric chelate* was prepared from the aqueous solution of the chelating agent or a tri-alkali metal salt of either of them by admixture with the required volume of an aqueous solution of ferric sulfate to provide the ratio of one hundred grams of the chelating agent to fifteen grams of iron, in the same manner as described with the use of ferrous sulfate for preparation of the ferrous chelate, in aqueous solution. The aqueous solution of the ferric chelate likewise was orange to dark red in color, contained thirty to forty percent of the chelate, and had a pH between 8 and 9. The ferric chelate can also be prepared in similar manner by admixing with the aqueous solution of the chelating agent the corresponding amount of an aqueous solution of some other water-soluble ferric salt that does not destroy the chelating agent, such as ferric chloride or ferric nitrate. It can also be prepared by admixing the required amount of an aqueous suspension of ferric hydroxide. The ferric chelate can be had in dry form also by spray drying the aqueous solution of it.

*The chelating agent in free acid form.*—The aqueous solution obtained above of the tri-alkali metal salt, such as the trisodium or tripotassium salt, of the chelating agent can be passed in convenient concentration through a column packed with the acid form of a cationic exchange resin such as "Dowex–50" (available from the Dow Chemical Company, Midland, Michigan). The column can then be eluted with one-tenth molal ammonium hydroxide to yield an eluate containing the free acid form of the respective chelating agent. The aqueous eluate of such free acid can be evaporated to dryness to yield the compound in dry state.

While the trisodium or tri-potassium salts of either of these hydroxyethyl polycarboxymethyl diethylenetriamines is obtained by the method described above starting with diethylenetriamine or N,N-dihydroxyethyl diethylenetriamine respectively, they and other water-soluble salts can be prepared by direct addition of the calculated theoretical amount of the particular alkali metal hydroxide or other necessary alkaline substance to the free acid, preferably in aqueous solution, and evaporating to dryness.

The water-soluble salts of either of these hydroxyethyl polycarboxymethyl diethylenetriamines embraced by the invention, and obtainable, for example, by the just described direct neutralization of one or more of its carboxyl groups are those of the monovalent metals as well as those formed with monovalent cationic radicals. Particularly included are its water-soluble salts with the "alkali-type" cations. Among these latter are its salts with an alkali metal as sodium, potassium, lithium, caesium, as well as those with the nitrogen-containing or ammonia-derived cations, for example, its ammonium salts and its salts with amines, such as with an alkanolamine as mono-, di-, or tri-ethanolamine or -propanolamine, or other such alkanolamine particularly lower alkanolamine, or with an alkylamine such as mono-, di-, or trimethylamine or -ethylamine, or other such lower alkylamine. As ammonium salts are so frequently grouped with the alkali metal salts, they likewise can be jointly considered here as illustrative of a monovalent alkali salt of the class consisting of the alkali metal and the ammonium salts.

A monovalently substituted salt is formed when the hydrogen of only one carboxyl group of the hydroxyethyl polycarboxymethyl diethylenetriamine is replaced by a monovalent metal or other monovalent cation such as any of the ammonia-derived cations exemplified above.

A divalently substituted salt results when the hydrogen of each of two of the carboxyl groups is thus replaced. Then a trivalently substituted salt results when the hydrogen of each of the three carboxyl groups similarly is replaced by one or another such monovalent metal or other monovalent cation.

The water-soluble chelate complexes of either of these hydroxyethyl polycarboxymethyl diethylenetriamines, in addition to copper and iron already mentioned above, are those formed with any of other polyvalent metals, namely, the divalent or higher than divalent metals. Thus, embraced among these chelate complexes of either of these sequestering agents are those of divalent metals such as the alkaline earth metals as barium, calcium, strontium, with magnesium included among them, and the iron group metals iron, nickel, and cobalt, and others such as copper, zinc, and manganese, as well as other divalent metals. The chelate complexes of higher than divalent metals are not only those with metals such as iron, cobalt, and manganese and others like them that also exist in the divalent state, but also those with metals that are only trivalent such as aluminum, as well as those of metals of any other valence. It is possible to have the chelate complex of any of the metals so long as it is divalent or higher.

In a chelate complex with a divalent metal, or the divalent state of a metal that has two or more valence states, the hydrogen of each of the carboxyl groups of either of these diethylenetriamine derivatives is replaced by a valence bond of the divalent or higher valent metal. Thus, either of these hydroxyethyl polycarboxymethyl diethylenetriamines also forms further complexes with the higher valence states of the various polyvalent metals having at least two valence states as well as with other higher than divalent metals.

Either of these hydroxyethyl polycarboxymethyl diethylenetriamines can be used in aqueous solutions to prevent the precipitation of the hydroxides of di-, tri- and tetravalent metal ions, for it is an advantageously effective complexing agent for such metals as calcium, magnesium, copper, zinc, manganese, iron (especially ferric), nickel, and cobalt, and other metals, in such solutions. The salts of either of these hydroxyethyl polyaminocarboxylic acids with the "alkali-type" cations, such as its alkali metal salts and ammonia-derived salts, are also useful as sequestering agents as well as for making chelate complexes with the various metal cations indicated. These chelate complexes with iron and the various other metals referred to above are water-soluble.

The iron chelate complex, particularly with ferric iron, is useful in agriculture, as in the treatment of trees suffering from iron chlorosis, for example, citrus trees growing in calcareous soils. As can be done with the iron chelate complexes, others of the metal chelate complexes can likewise be incorporated in fertilizers to be applied to the soil, or they can be dissolved in aqueous solution to be sprayed on the foliage or as a drench, similarly to overcome an unbalanced relative proportion to other metals of the respective one of the so-called minor metals that trees and plants derive from the soil.

Either of these hydroxyethyl polycarboxymethyl diethylenetriamines (in its free acid form), and in some instances its salts with the "alkali-type" cations, can be used in electroplating, and metal treating baths that contain metal ions that would precipitate under the operating conditions, to prevent the precipitation of such metals, for example, to prevent the precipitation of ferric iron.

While the invention has been described in relation to various specific embodiments of it, it is understood that many substitutions and other modifications can be made in it within the scope of the several appending claims that are intended also to cover equivalents as well.

What is claimed is:

1. A member of the class consisting of (a) N-hydroxyethyl N,N',N",N"-tetracarboxymethyl diethylenetriamine; (b) N,N-dihydroxyethyl N',N",N"-tricarboxymethyl diethylenetriamine; (c) the water-soluble salts of (a) and (b) with monovalent cations; (d) the water-soluble chelates of (a), (b) and (c) with polyvalent metals; and aqueous solutions of (a), (b), (c) and (d).

2. A water-soluble metal chelate of N-hydroxyethyl N,N',N",N"-tetracarboxymethyl diethylenetriamine with a polyvalent metal.

3. A water-soluble metal chelate of N-hydroxyethyl N,N',N",N"-tetracarboxymethyl diethylenetriamine, wherein the metal is one of the iron group metals.

4. A water-soluble metal chelate of N,N-dihydroxyethyl N',N",N"-tricarboxymethyl diethylenetriamine, with a polyvalent metal.

5. A water-soluble metal chelate of N,N-dihydroxyethyl N',N",N"-tricarboxymethyl diethylenetriamine, wherein the metal is one of the iron group metals.

6. N-hydroxyethyl N,N',N",N"-tetracarboxymethyl diethylenetriamine.

7. A water-soluble salt of N-hydroxyethyl N,N',N", N"-tetracarboxymethyl diethylenetriamine with a monovalent cation.

8. N,N-dihydroxyethyl N',N",N"-tricarboxymethyl diethylenetriamine.

9. A water-soluble salt of N,N-dihydroxyethyl N',N", N"-tricarboxymethyl diethylenetriamine with a monovalent cation.

References Cited in the file of this patent

UNITED STATES PATENTS

| | | |
|---|---|---|
| 2,413,856 | Bersworth | Jan. 7, 1947 |
| 2,428,353 | Bersworth | Oct. 7, 1947 |
| 2,532,391 | Bersworth | Dec. 5, 1950 |
| 2,673,213 | Bersworth | Mar. 23, 1954 |

OTHER REFERENCES

Brintzinger et al.: Zeit. F. Anor. U. Allgem. Chem. 251 (1943), 285–294.

Bersworth Chemical Co. Adv. (V) Chem. and Eng. News 31, December 7, 1953, 5141.

UNITED STATES PATENT OFFICE
Certificate of Correction

Patent No. 2,831,885

April 22, 1958

Harry Kroll et al.

It is hereby certified that error appears in the printed specification of the above numbered patent requiring correction and that the said Letters Patent should read as corrected below.

Column 1, lines 63 to 65, the formula should appear as shown below instead of as in the patent—

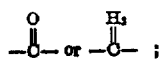

column 2, lines 9 and 10, the formula should appear as shown below instead of as in the patent—

Signed and sealed this 22nd day of July 1958.

[SEAL]

Attest:
KARL H. AXLINE,
Attesting Officer.

ROBERT C. WATSON,
Commissioner of Patents.